United States Patent

Medina

Patent Number: 5,889,897
Date of Patent: Mar. 30, 1999

[54] METHODOLOGY FOR OCR ERROR CHECKING THROUGH TEXT IMAGE REGENERATION

[75] Inventor: Mitchell Medina, Essex Fells, N.J.

[73] Assignee: International Patent Holdings Ltd., Hamilton, Bermuda

[21] Appl. No.: 835,540

[22] Filed: Apr. 8, 1997

[51] Int. Cl.[6] ............................. G06K 9/03; G06K 9/18; G06K 9/68

[52] U.S. Cl. .................. 382/310; 382/311; 382/182; 382/218

[58] Field of Search .................................. 382/309, 310, 382/311, 181, 182, 218, 219, 220, 227, 228; 364/737; 371/3; 707/530, 531

[56] References Cited

U.S. PATENT DOCUMENTS

| | | | |
|---|---|---|---|
| 3,634,822 | 1/1972 | Chow | 382/228 |
| 4,068,212 | 1/1978 | Templeton | 382/311 |
| 5,012,521 | 4/1991 | Endo et al. | 382/309 |
| 5,253,307 | 10/1993 | Wayner et al. | 382/22 |
| 5,257,323 | 10/1993 | Melen et al. | 382/39 |
| 5,271,067 | 12/1993 | Abe et al. | 382/311 |
| 5,418,864 | 5/1995 | Murdock et al. | 382/309 |
| 5,455,872 | 10/1995 | Bradley | 382/228 |
| 5,615,284 | 3/1997 | Rhyne et al. | 382/311 |
| 5,732,152 | 3/1998 | Sakai et al. | 382/311 |
| 5,734,761 | 5/1998 | Bagley | 382/311 |
| 5,748,807 | 5/1998 | Lopresti | 382/311 |

*Primary Examiner*—Bipin Shalwala
*Attorney, Agent, or Firm*—Foley & Lardner

[57] ABSTRACT

A method of reducing errors in optical character recognition (OCR) procedures includes digitizing an image of an object, the image containing alpha-numeric characters, and storing a bitmap of the digitized image as a scanned document file (SDF). An OCR step is performed to obtain at least one candidate character, and an indication of the at least one candidate character is stored in a textural results file (TRF). The font of the digitized image is determined and the font is stored in a regeneration library file (RLF). A regenerated image file is generated using the TRF and the RLF. At least a portion of the regenerated image file is compared with a corresponding portion of the bitmap of the digitized image stored in the SDF. The TRF is outputted if the results of the comparison indicate a match of at least the portion of the regenerated image file with the corresponding portion of the bitmap. If a match is not found, further processing is performed to resolve the mismatch.

14 Claims, 3 Drawing Sheets

METHODOLOGY FOR OCR ERROR CHECKING THROUGH TEXT IMAGE REGENERATION

FIELD OF THE INVENTION

The invention is in the field of optical character recognition (OCR) and is directed to reducing errors in OCR methods and apparatuses.

BACKGROUND OF THE INVENTION

The ability to accurately recognize characters by scanning hard copy images is extremely important for many forms of automated data processing and has wide applications ranging from automatic text recognition for word processing to banking applications wherein numerical data is scanned, processed and stored. Accuracy is essential in most applications.

A great deal of effort has been devoted to correcting errors which invariably result from commercially available OCR devices. In some commercially available OCR devices, a confidence level indication is provided with the recognized character in order to permit flagging certain characters which are recognized with a low degree of confidence. In such cases, an operator may subsequently check the flag character and correct it if necessary by reference to the original scanned hard copy image.

An additional method for lowering the error rate for OCR devices is that of employing multiple OCR units each with their associated confidence factor and the use of certain algorithms for combining these confidence factors to obtain the most probable character. See for example U.S. Pat. No. 5,257,323; U.S. Pat. No. 5,418,864; and U.S. Pat. No. 5,455,872 incorporated herein by reference.

While the above approaches to improving error rates in OCR devices have some advantages, the current OCR recognition techniques are still inadequate for a number of reasons. First, the various confidence factors provided by the manufacturer of OCR equipment may, in fact, be incorrect and there are numerous instances in which characters are identified incorrectly without an associated low confidence factor, as for example, in substitution errors. The character "c", for example, may be incorrectly recognized as a character "e" with a 100% degree of confidence so in this case the OCR device does not detect a clear substitution error. In the multiple OCR environment, the typical majority voting or weighing techniques utilized in the prior art may, and often do, yield incorrect results. Further, most systems have no mechanism for dealing with characters which are completely unrecognizable.

Of course, manual techniques have also been utilized for checking the accuracy of scanned data. Some approaches utilize both machine scanning/recognition (OCR) and manual keying so that the data has effectively has been input twice, once by machine and once by hand. Subsequent machine comparisons then reject characters on the basis of inconsistencies in the two sets of data. Such manual keying is tedious, time consuming and expensive.

SUMMARY OF THE INVENTION

In accordance with the principles of the invention, there is provided a method for reducing errors in OCR systems comprising the steps of:

(a) digitizing an image of an object wherein the image contains alpha-numeric characters;

(b) storing a bitmap of all or part of the digitized image as a scanned document file (SDF);

(c) performing a standard OCR procedure to obtain candidate characters;

(d) storing the candidate characters as a textural results file (TRF);

(e) determining the font and/or position of the characters in the digitized image;

(f) storing the determined font and/or position as a regeneration library file (RLF);

(g) generating a regeneration image file (RIF) using the TRF and RLF files;

(h) comparing the regenerated image file with the bitmap of the digitized image stored in the scanned document file;

(i) outputting candidate characters if the results of the comparison step (h) indicate a match of the regenerated image file with the bitmap of said scanned document file; and (j) performing further processing to resolve the mismatch if a match is not found.

DETAILED DESCRIPTION OF THE PREFERRED EMBODIMENTS

Figure 1:
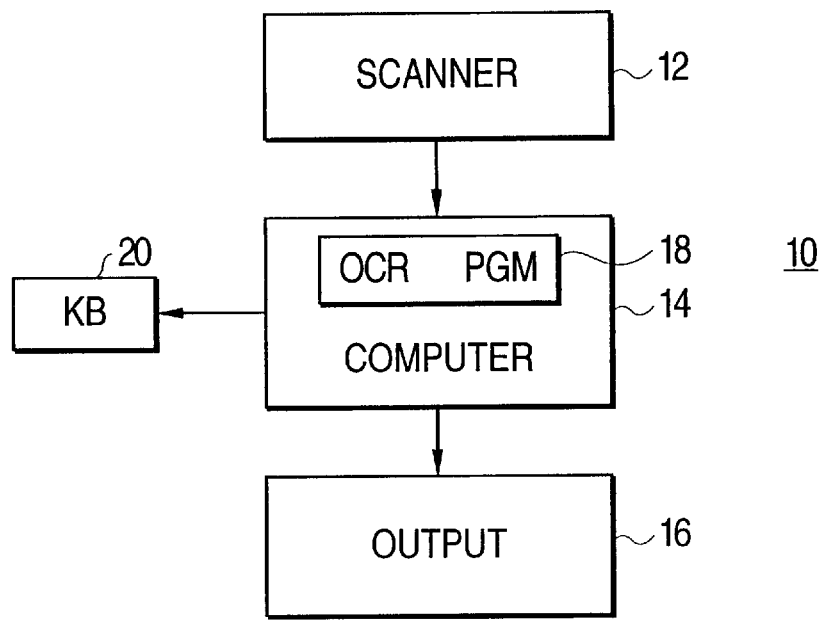
FIG. 1 illustrates a black diagram of the apparatus which may be utilized to implement the invention.

As illustrated in FIG. 1, the error checking apparatus 10 in accordance with the invention, comprises a scanner 12, computer 14 and output 16. The computer 14 is preferably a program digital computer which has stored therein an optical character recognition program 18 which may consist of any standard, commercially available OCR program, e.g., Xerox's ScanworX or Textbridge. Many different OCR processing approaches have been utilized and are commercially available. Some techniques utilize neural networks, feature extractions such as line or circle extraction, edge examination and the like.

A confidence factor is usually provided by such conventional OCR program 18 as a measure of the degree of confidence associated with the candidate character. The output 16 may be routed to one or more of a display device, storage device, printer or data transmitter. In most cases, the output 16 would be routed to at least a CRT display so that the operator may key in flagged characters using keyboard 20 connected to the computer 14.

Figure 2:
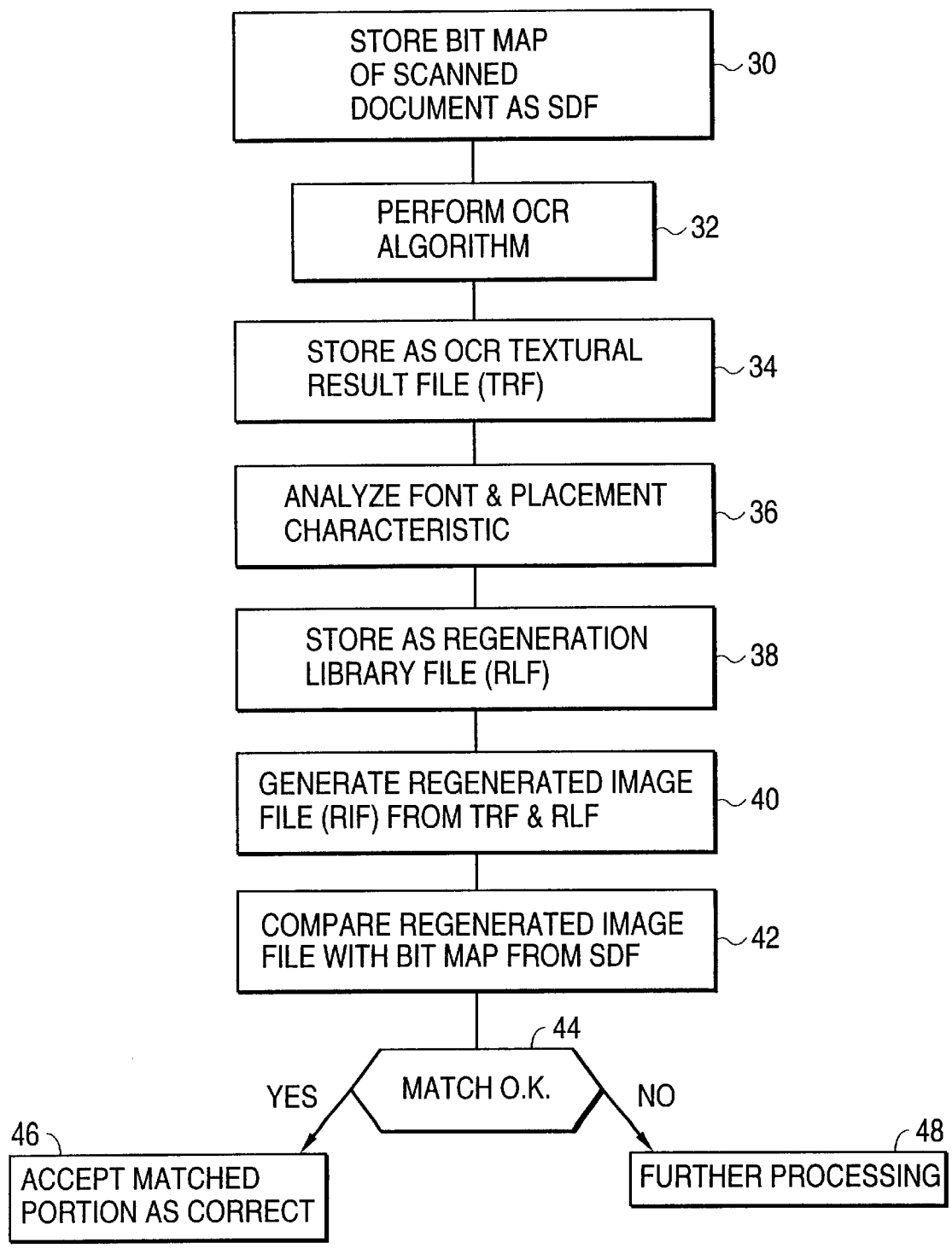
FIG. 2 shows a flow diagram illustrating the operation of the computer program in accordance with the principles of the invention.

FIG. 2 illustrates a flow chart governing operation of the apparatus shown in FIG. 10 and including program aspects of the computer 14.

The scanner 12 is first utilized to scan a hard copy of a document containing alpha-numeric text. The digitized image is stored as a bitmap in a scanned document file SDF as indicated in step 30. The conventional OCR program 18 then performs the OCR algorithm or procedure specific to the manufacturer's design as indicated in step 32. In step 34, the results of the OCR processing are stored as a textural results file TRF within a memory of computer 14. In step 36, the program computer 14 analyzes and determines the font or fonts of characters in the SDF and may also determine a placement characteristic such as the position of the character being identified within the document or its relative position with respect to an initial character or the document edge or some other reference point. The determination of the specific font may be done with template matching techniques or other procedures per se known in the art. Likewise, determination of the position of the character being analyzed may be determined according to known techniques. The font information determined in step 36 may include the typeface information as well as the size or scale of the character being examined. Techniques for determining the font and position are included in some conventional OCR programs 18 but may alternatively be provided by separate programs in accordance with well known techniques, see for example U.S. Pat. No. 5,253,307.

The font and placement characteristic determined in step 36 are then stored as a regeneration library file (RLF) in step 38. Next, in step 40, a bitmap is generated utilizing the TRF and RLF previously stored. This bitmap is termed a regenerated image file and is based on stored font data and candidate character data from the textural document file. The regenerated image file may also utilize the positional data of the candidate character within the document. In step 42, at least a portion of the regenerated image file (bitmap image) is compared with the corresponding portion of the bitmap from the scanned document file to determine if there is a match. The placement characteristic may be used to determine the corresponding portion of the SDF that aligns with the portion of the regenerated image file. If a match occurs as determined in step 44, the program proceeds to step 46 wherein the matched portion of the textural results file (TRF) is utilized as the correct output text. If a match does not occur then further processing takes place as indicated in step 48.

The comparison step 42 may take place with respect any portion or the whole of the document being digitized. The portion may be a character, word, text string, sentence, paragraph, page, multiple pages or the whole document. For example, the portion may simply be that portion of the regenerated image file that corresponds to a particular character (e.g., the first character of the document) with the corresponding character in the textural results file. Error checking in this embodiment simply proceeds on a character-by-character basis. In another embodiment, the portion may be a page, and the comparison may take place on a page-by-page basis. In this case, the determination of a match in step 44 is relative to the entire page, and if there are no errors, the entire page is accepted as correct. If there is a "no match" condition, the entire page is further processed in step 48.

The match condition may be set to some predetermined criteria such that the bitmap overlap between the candidate bitmap generated in step 40 and the bitmap from the scanned character file stored in step 30 are congruent within a predetermined percent such as 99% or the like. Two pixels are congruent if they each have a "dark" or "1" bit at a pixel location and are not congruent if one pixel location indicates a dark spot (bit 1) and the other pattern indicates a light spot (bit 0).

The further processing step (48) may include machine resolution of mismatches by alternative or additional OCR algorithms, alternative regeneration engines utilized in step 40 or alternative preset criteria or confidence levels utilized in steps 42 and 44. In its simplest implementation, the further processing step 48 entails utilizing a display and providing a special character at a position corresponding to the character in question so that a human operator may examine the original hard copy text object or the displayed SDF and determine from the indicated position or the special character on the display the corresponding position on the hard copy to thus identify the correct character and key in same. The display may utilize a flashing and/or special character (e.g., a "tilde") as a predetermined output indication to assist the operator in locating the corresponding image on the hard copy. Alternately, a reverse video image may be utilized or any other method to flag the particular character as one that needs to be checked by the operator. All or portions of the SDF and TRF may be displayed side-by-side in a split-screen mode to facilitate operator arbitration of mismatches between corresponding characters.

Figure 3:
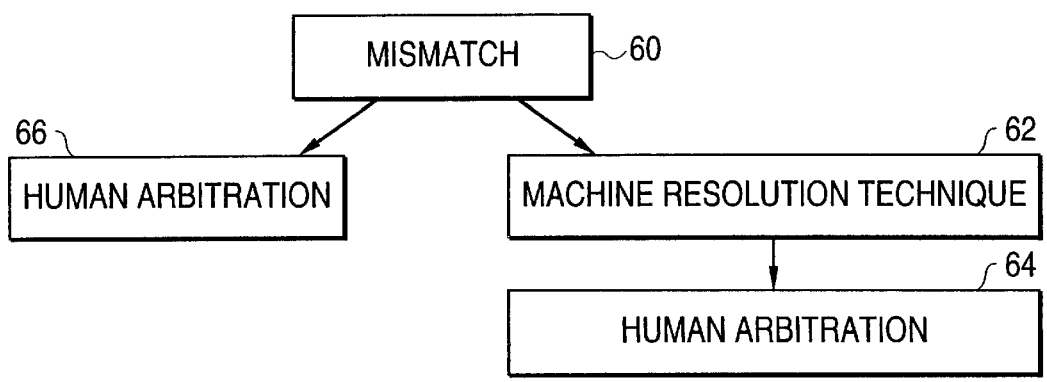
FIG. 3 illustrates the further processing step in the event of a mismatch in accordance with an embodiment of the invention.

The further processing of step 48 (FIG. 2) is illustrated in FIG. 3. In step 60 mismatches are identified with respect to any portion or whole of the document(s) scanned. In one embodiment, mismatches are routed to be further analyzed by means of machine resolution techniques as in step 62 with subsequent human arbitration in step 64 if the results of step 62 do not resolve the error. Alternately, the mismatch condition may be directly routed for human arbitration as in step 66. Machine resolution techniques include alternate or additional OCR algorithms (including voting algorithms); alternate regeneration engines; alternate comparison confidence levels or other techniques. Human arbitration generally comprises visual inspection and inputting in a correct character(s) or selecting a character among several displayed choices. The inputting/selecting may be done by keyboard, voice command, touch screen, mouse or any other technique.

Figure 4:
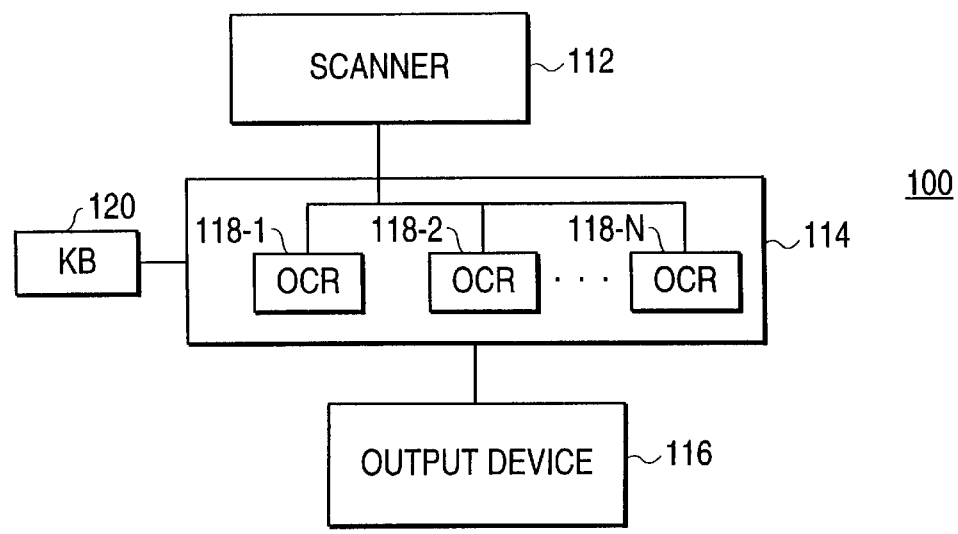
FIG. 4 shows an alternative embodiment of the invention in block diagram form similar to that of FIG. 1.

The application of the principles of the invention to multiple OCR engines is straightforward and is illustrated in FIG. 4. Scanner 112 is utilized to scan the alpha-numeric text of the hard copy document and the digitized results are fed to a plurality of OCR engines such as indicated by 118-1, 118-2 . . . 118-N. These OCR engines are software programs stored within one or multiple computers 114. An output device at 116 is comparable to device 16 in FIG. 1. When multiple OCR engines are utilized, a voting technique or some other algorithmic technique is employed to appropriately combine and weigh the various results of the different OCR algorithms. A single output is provided representing the most probable character candidate. See, for example, U.S. Pat. Nos. 5,455,872 and 5,418,864 incorporated herein by reference. Once the most probable candidate is determined, the candidate character is processed according to step 34 in FIG. 2 and steps subsequent thereto. Thus, FIG. 2 is appropriate for the embodiment of FIG. 4 except that the OCR algorithm step 32 is now replaced by a multiple OCR algorithm step and a selection among the OCRs of the most probable character.

While the invention has been described with reference to preferred embodiments, it is understood that alternative embodiments will be apparent to those of skill in the art, and the invention is intended to cover all such alternative embodiments as are encompassed by the attached claims.

What is claimed is:

1. A method of reducing errors in optical character recognition procedures comprising the steps of:
   (a) digitizing an image of an object, said image containing alpha-numeric characters;
   (b) storing a bitmap of said digitized image as a scanned document file (SDF);
   (c) performing an OCR step to obtain at least one candidate character;

(d) storing an indication of said at least one candidate character in a textural results file (TRF);

(e) determining the font of said digitized image;

(f) storing said determined font in a regeneration library file (RLF);

(g) generating a regenerated image file using said TRF and said RLF;

(h) comparing at least a portion of said regenerated image file with a corresponding portion of the bitmap of said digitized image stored in said scanned document file;

(i) outputting said TRF if the results of said comparison step indicate a match of at least said portion of said regenerated image file with said corresponding portion of said bitmap in said scanned document; and (j) performing further processing to resolve the mismatch if a match is not found in step (i).

2. The method as recited in claim 1 further including the step of: determining at least one placement characteristic of said digitized image, and wherein step (h) includes the step of utilizing the placement characteristic to determine the correspondence of said portion of said regenerated image file with the portion of said scanned document file.

3. The method as recited in claim 2 wherein step (j) includes: providing a predetermined output indication at a position corresponding to a portion of said digitized image which does not match said corresponding portion of said regenerated image file.

4. The method as recited in claim 3 wherein said further processing includes operator checking of said digitized image at a position corresponding to said predetermined output indication.

5. The method as recited in claim 1 wherein step (j) includes: providing a predetermined output indication at a position corresponding to a portion of said digitized image which does not match said corresponding portion of said regenerated image file.

6. The method as recited in claim 5 wherein said further processing includes operator checking of said digitized image at a position corresponding to said predetermined output indication.

7. The method as recited in claim 1 in which step (j) includes the use of at least one of the following machine resolution techniques:

a) utilizing alternative OCR steps from those performed in step (c);

b) utilizing additional OCR steps from those performed in step (c);

c) utilizing voting among multiple OCR steps;

d) utilizing alternative regeneration step from utilized in step (g); and e) utilizing an initial comparison threshold in the comparing step (h) and utilizing an alternative comparison threshold from the initial comparison threshold used in step (h).

8. The method as recited in claim 7 in which step (j) includes: human arbitration of any mismatches which are not resolved by one or more of said machine resolution techniques.

9. The method as recited in claim 8 wherein step (j) includes: providing a predetermined output indication at a position corresponding to a portion of said digitized image which does not match said corresponding portion of said regenerated image file.

10. The method as recited in claim 9 wherein said further processing includes operator checking of said digitized image at a position corresponding to said predetermined output indication.

11. The method as recited in claim 2 in which step (j) includes the use of at least one of the following machine resolution techniques:

a) utilizing alternative OCR steps from those performed in step (c);

b) utilizing additional OCR steps from those performed in step (c);

c) utilizing voting among multiple OCR steps;

d) utilizing alternative regeneration step from utilized in step (g); and e) utilizing an initial comparison threshold in the comparing step (h) and utilizing an alternative comparison threshold from the initial comparison threshold used in step (h).

12. The method as recited in claim 11 in which step (j) includes: human arbitration of any mismatches which are not resolved by one or more of said machine resolution techniques.

13. The method as recited in claim 12 wherein step (j) includes: providing a predetermined output indication at a position corresponding to a portion of said digitized image which does not match said corresponding portion of said regenerated image file.

14. The method as recited in claim 13 wherein said further processing includes operator checking of said digitized image at a position corresponding to said predetermined output indication.

* * * * *